United States Patent [19]

Anderson et al.

[11] Patent Number: 5,178,256
[45] Date of Patent: Jan. 12, 1993

[54] LOADER MACHINE

[75] Inventors: Gerald R. Anderson, Campbell; David M. Williams, Livermore, both of Calif.

[73] Assignee: American Licorice Company, Union City, Calif.

[21] Appl. No.: 890,851

[22] Filed: Jun. 1, 1992

Related U.S. Application Data

[62] Division of Ser. No. 788,589, Nov. 6, 1991.

[51] Int. Cl.$^5$ ............................................. B65G 17/32
[52] U.S. Cl. ..................................... 198/384; 198/392
[58] Field of Search ............... 198/384, 392, 612, 533, 198/560, 550.7, 549

[56] References Cited

U.S. PATENT DOCUMENTS

| | | | |
|---|---|---|---|
| 2,769,539 | 11/1956 | Packman | 198/612 |
| 3,817,423 | 6/1974 | McKnight | 198/392 |
| 3,948,386 | 4/1976 | Nalbach | 198/384 |

FOREIGN PATENT DOCUMENTS

| | | | |
|---|---|---|---|
| 0222274 | 4/1958 | Australia | 198/549 |
| 0262716 | 12/1985 | Japan | 198/384 |
| 0391563 | 9/1965 | Switzerland | 198/550.7 |

*Primary Examiner*—D. Glenn Dayoan
*Assistant Examiner*—James R. Bidwell

[57] ABSTRACT

An automatic loading machine is provided for aligning and loading a predetermined amount of elongated strips of product into individual containers wherein batches of elongated strips are periodically discharged from a product feed. A turret assembly is provided which has a plurality of buckets and each of the batches from the product feed is received by a separate bucket. The turret assembly is continuously vibrated and, as each bucket moves through a horizontal path, the batches of elongated strips carried therein become somewhat more aligned. The strips are dropped out of the buckets onto a flight conveyor and are conveyed to a discharge point where each batch is transferred into a separate container.

7 Claims, 9 Drawing Sheets

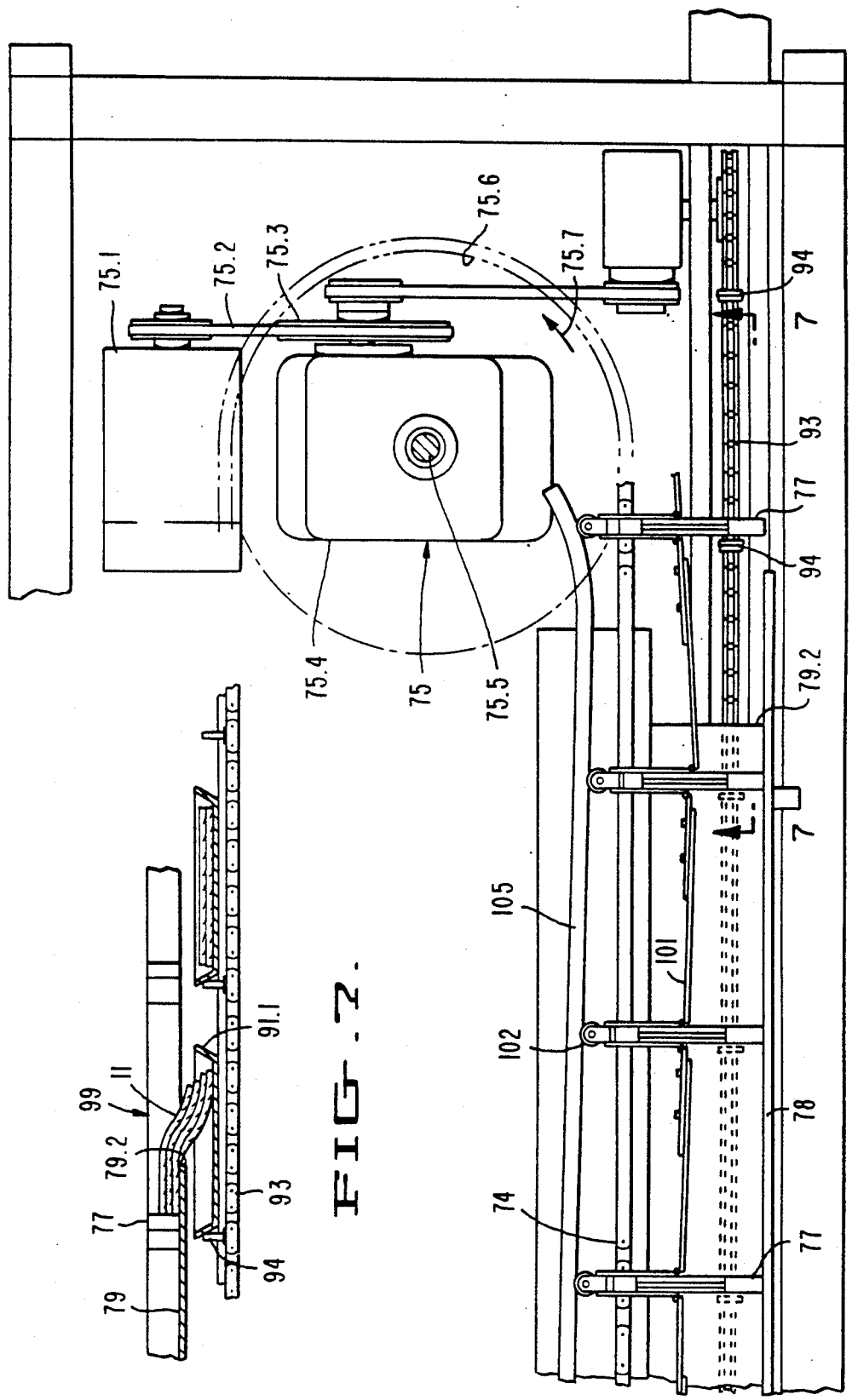

LOADER MACHINE

This application is a division of application Ser. No. 788,589, filed Nov. 6, 1991 pending.

BRIEF SUMMARY OF THE INVENTION

This invention relates in general to a loading machine which is used to align and load predetermined amounts of elongated strips of product into individual containers. More specifically, this invention relates to an automatic tray loading machine which may be used for aligning and loading batches of licorice sticks into individual trays.

The invention generally relates to elongated strips of product which are released in batches from an automatic weighing machine or other batch product feed. When used for loading licorice sticks, the invention is used in conjunction with an automatic weighing machine, which discharges a predetermined weight of licorice strips, which are received by the instant invention, are aligned into generally parallel relationship as well as having the ends of the licorice sticks generally aligned and thereafter loaded into individual trays.

In the general sense, the invention is capable of use in conjunction with various types of elongated strips of product including french fried potatoes, jerky, vegetables such as carrots and celery, and licorice. In the specific case of licorice, it is important that most of the components of the apparatus which handle the licorice sticks are continually vibrated to provide a live surface which helps to align the licorice sticks and which prevents the licorice sticks from sticking to the surfaces of the apparatus.

A primary object of the invention is to provide an automatic loading machine capable of aligning and loading predetermined amounts of elongated strips of product into individual containers.

A further object of the invention is to provide an automatic loading machine for aligning and loading a predetermined weight of licorice sticks into individual trays wherein surfaces of the apparatus are constantly being vibrated as the licorice sticks are handled.

A further object of the invention is to provide an automatic loading apparatus capable of operating on a continuous feed basis wherein batches of elongated strips of product are continuously fed into the apparatus and are continuously aligned and loaded into individual containers.

Other objects and advantages of the invention will become apparent from the following description of the preferred embodiments.

BRIEF DESCRIPTION OF THE DRAWINGS

FIG. 6 is a plan view of the discharge portion of the apparatus;

FIG. 7 is a section on the line 7—7 of FIG. 6;

DETAILED DESCRIPTION OF THE DRAWINGS

Figure 1:
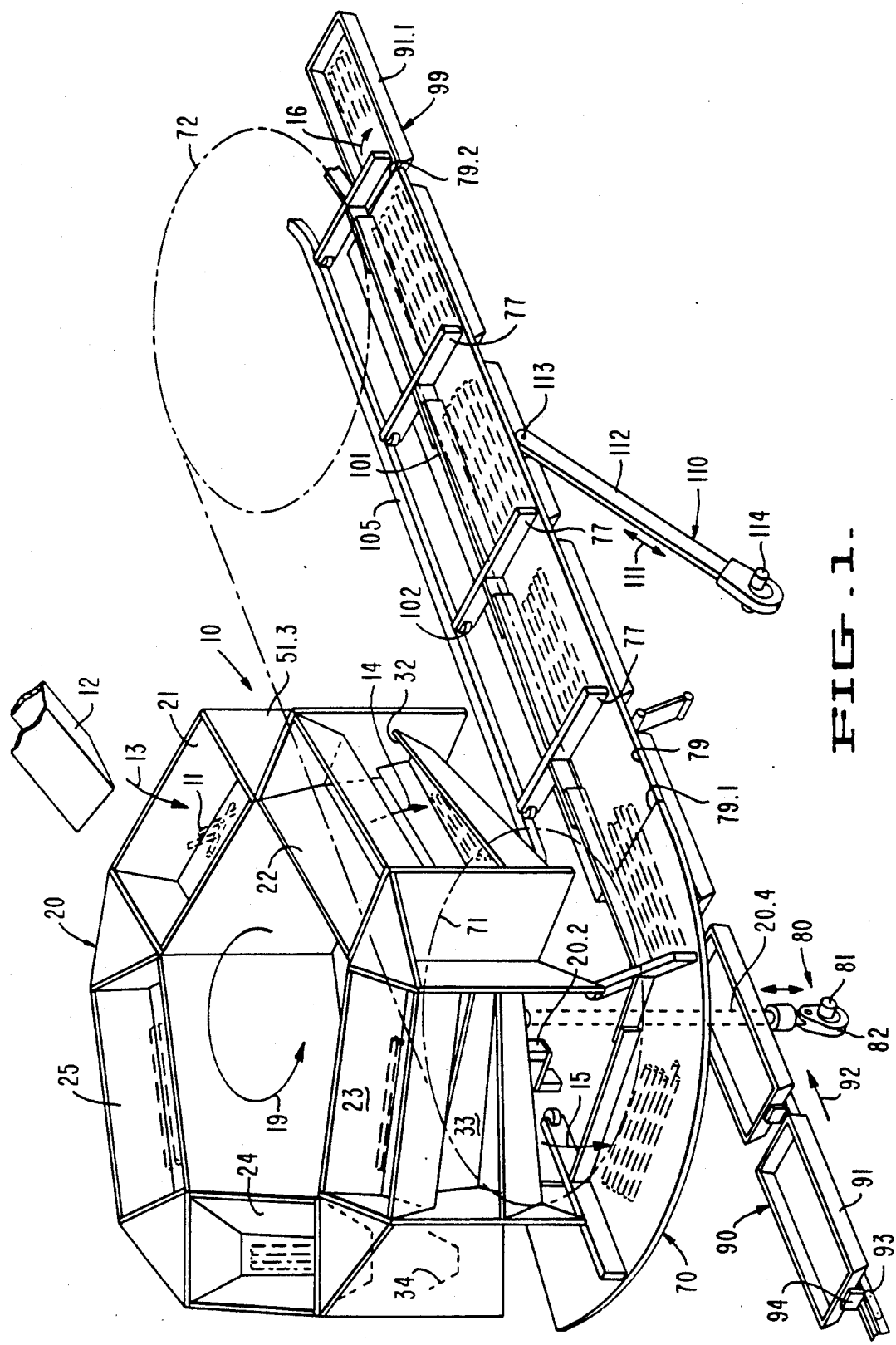
FIG. 1 is a perspective view of some of the internal components of the machine with much of the superstructure not shown for clarity.

Referring to FIG. 1, a loading machine shown generally as 10 is shown for receiving elongated strips of material 11 from an automatic weighing machine or other product feed which is not shown. The automatic weighing machine or other product feed device is not a subject of this invention. As shown in FIG. 1, an inclined feed chute means 12 is provided which receives batches of licorice sticks discharged from the automatic weighing machine (not shown) and feeds each batch into an individual bucket such as bucket 21 as described in greater detail below. Each individual batch of licorice sticks received by the loading apparatus 10 from feed chute means 12 is loaded into an individual tray such as tray 91.1 as described in detail below.

A turret assembly shown generally as 20 is provided which is adapted to rotate about a vertical axis which forms the center of the circular path represented by arrow 19. Turret assembly 20 includes a plurality of buckets including an upper level of buckets 21-25 and a lower level of buckets 31-35, of which only lower buckets 32 and 33 can be seen clearly in FIG. 1. The side walls of lower bucket 34 are shown in phantom in FIG. 1. It is within the scope of this invention to use a single level of buckets, but in the case of loading licorice sticks, it is preferred to use two levels of buckets.

As described in greater detail below, as turret assembly 20 rotates in the direction shown by arrow 19, a batch of licorice sticks will be discharged from feed chute means 12 into bucket 21 as shown by arrow 13. When bucket 21 rotates counterclockwise through about 288° to the position shown by bucket 22, the contents of the bucket will be discharged to the lower bucket as shown by arrow 14. The licorice sticks discharged as shown by arrow 14 are carried counterclockwise through about 288° along the path shown by arrow 19 to the position shown by lower bucket 33 and the contents are discharged as shown by arrow 15 onto flight conveyor shown generally as 70. The licorice strips are then advanced by flight conveyor and ultimately discharged into tray 91.1 along the path shown by arrow 16.

Flight conveyor 70 has a feed end represented by the circle shown as 71 and a discharge end shown generally by the circle 72. As shown in greater detail below, flight conveyor 70 is an endless conveyor, with a major portion not shown in FIG. 1 for clarity.

A tray conveyor shown generally as 90 keeps a steady supply of individual trays such as 91 moving in the direction of arrow 92 at a synchronized speed and synchronized intervals with flight conveyor 70 to readily accept batches of licorice sticks being discharged along the path shown by arrow 16.

Figure 3:
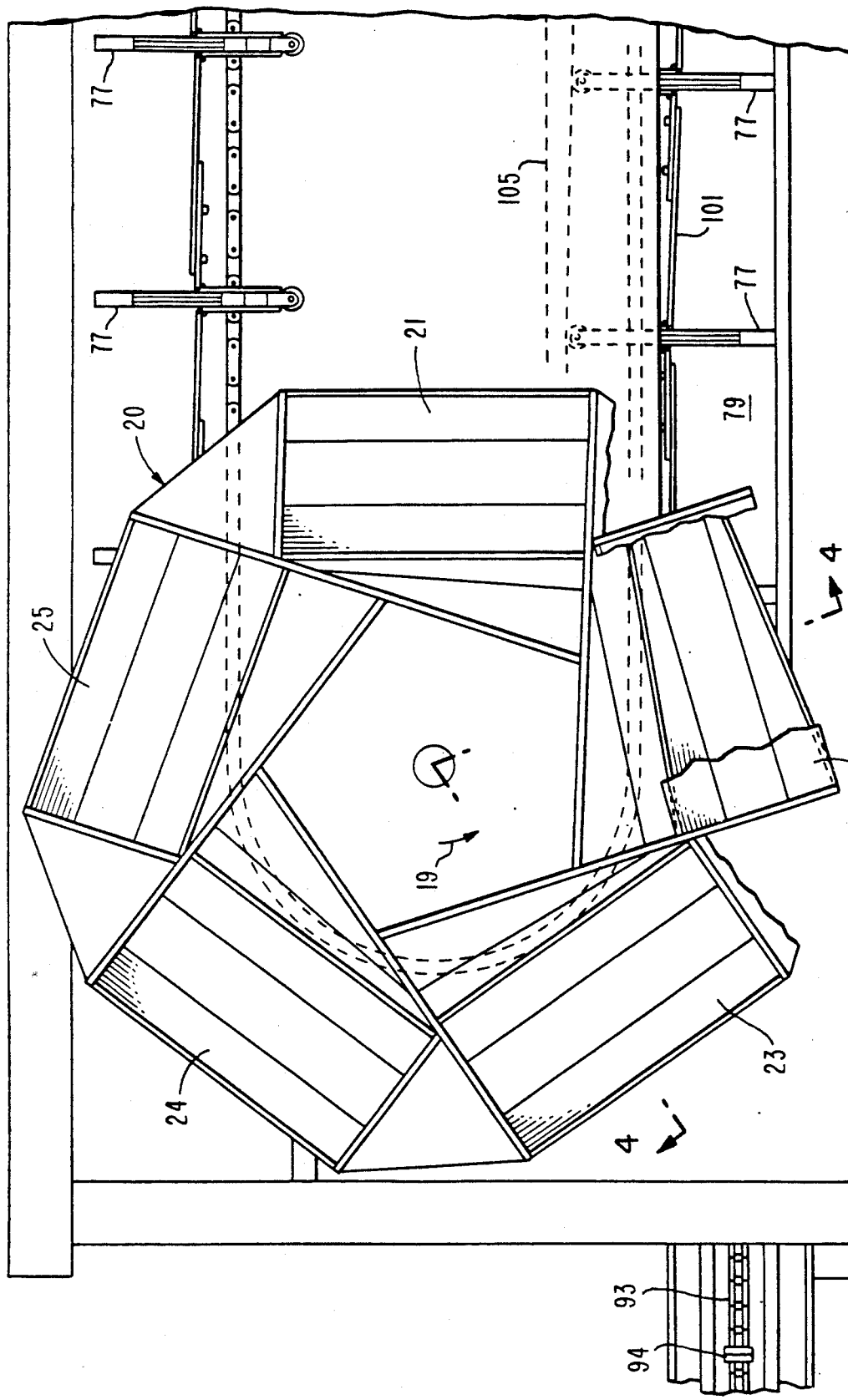
FIG. 3 is a plan view of a portion of the apparatus.
Figure 4:
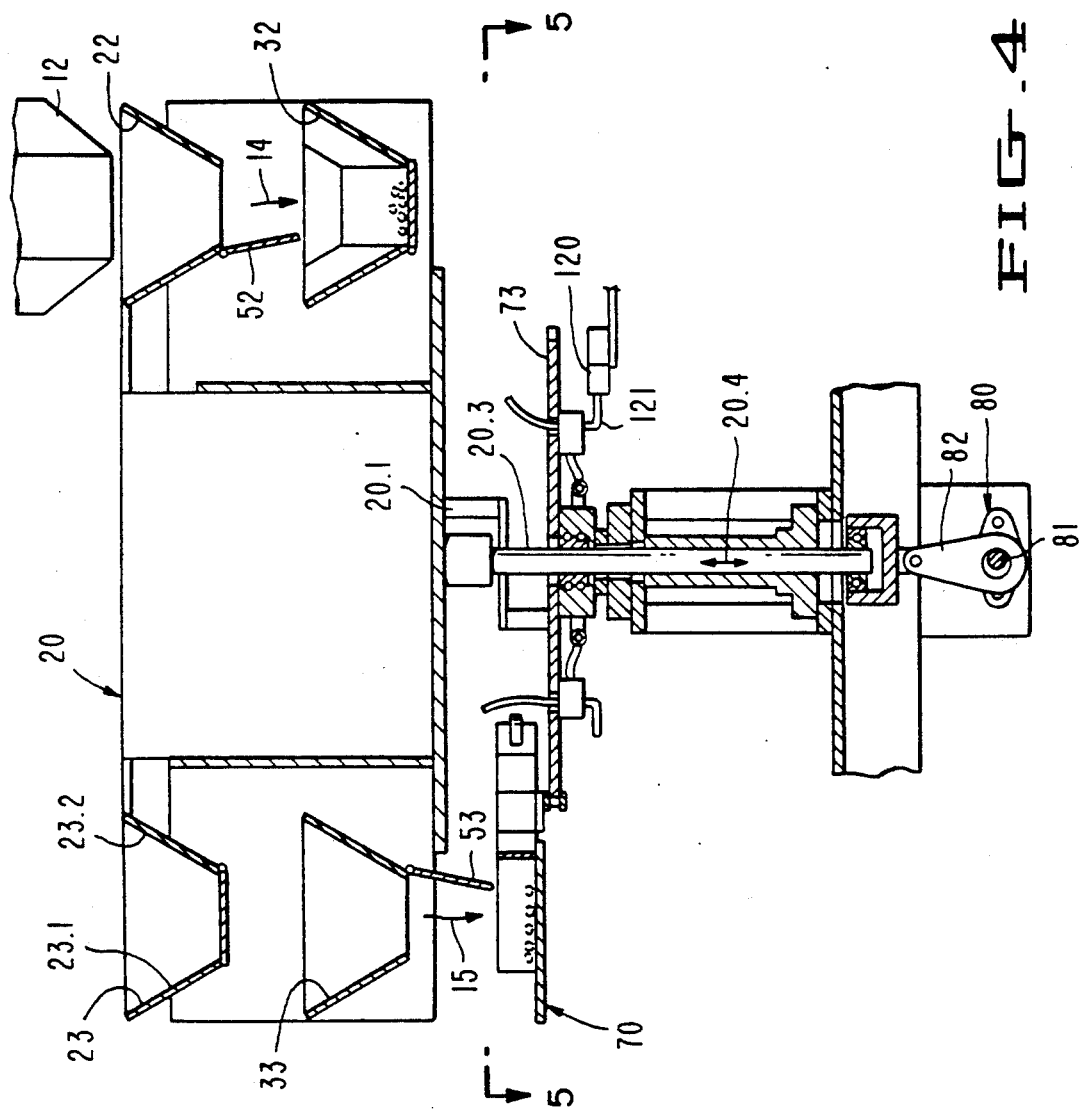
FIG. 4 is a section on the line 4—4 of FIG. 3.

The turret assembly 20 is shown in greater detail in FIGS. 3 and 4. FIG. 3 is a plan view and FIG. 4 is a view on the line 4—4 of FIG. 3. As shown in FIG. 3, bucket 21 is in essentially the same position shown as in FIG. 1 and is ready to receive a batch of licorice sticks. Bucket 22 is in position to drop its contents into lower bucket 32 as shown in FIG. 1. As shown in FIG. 4, bucket 22 is in the process of unloading a batch of licorice sticks into lower bucket 32. As turret assembly 20 continues to rotate in a counterclockwise direction shown by arrow 19, bucket 22 will advance to the position of bucket 21, and during this advancement, door 52 at the bottom of bucket 22 closes so that bucket 22 is ready to receive a batch of licorice sticks from the feed chute means 12. Referring to FIG. 4, lower bucket 33 is in the process of dropping a batch of licorice sticks onto flight conveyor 70 along the path shown by arrow 15. Door 53 forming the bottom of bucket 33 is open at this position of bucket 33 and closes as bucket 33 advances to the position occupied by bucket 32, as shown in FIGS. 1 and 4, so that it will be closed in order to receive a batch of licorice of sticks dropped from the upper level of buckets.

As shown best in FIG. 4, bucket 23 has side walls 23.1 and 23.2 which are inclined inwardly in an downward direction. The side walls of all other buckets are similarly inclined inwardly in a downward direction. The incline of the side walls tends to help align the licorice sticks or other elongated strips of product.

Figure 2:
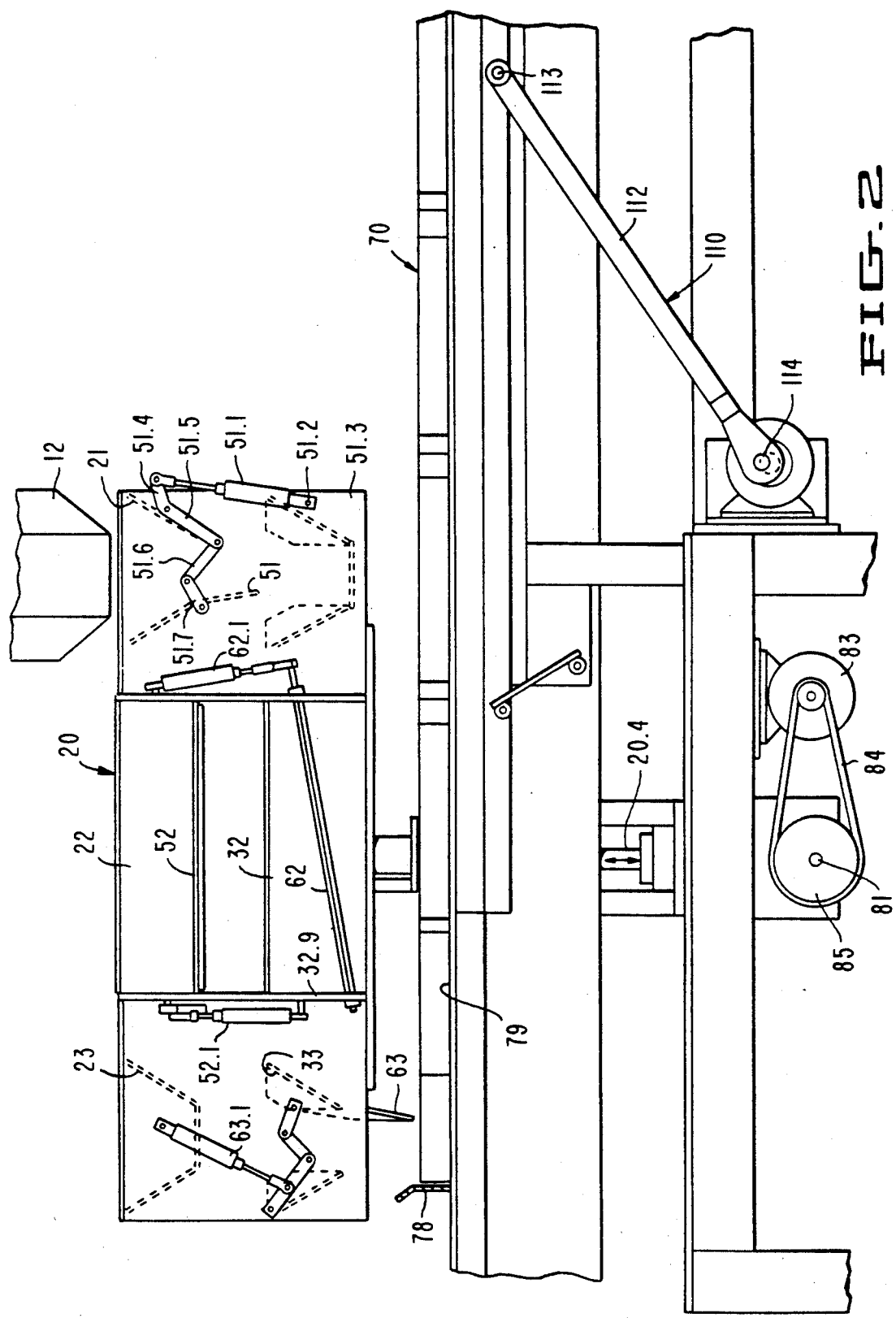
FIG. 2 is a side elevational view, showing some of the internal components of the machine, with portions of the machine not shown for clarity.

Referring to FIG. 2, a side elevational view is shown of the turret assembly 20 and some related parts of the apparatus. Also shown in FIG. 2 are the actuators for the bucket doors. These actuators have been deleted from FIG. 1 in the interest of clarity. As shown in FIG. 2, bucket 21 is shown with its door 51 in the open position just prior to door 51 being closed. An air cylinder 51.1 is mounted by pin 51.2 to a frame piece 51.3 of turret 20. Air cylinder 51.1 drives a set of linkage arms 51.4, 51.5, 51.6, and 51.7 to open and close door 51. Linkage arms 51.4–51.7 comprise an over the center knuckle joint to keep door 51 locked closed unless it is opened by the actuation of air cylinder 51.1. This feature is important because, as described below, the entire turret mechanism 20 is being constantly vibrated when the apparatus is in operation and it is important to avoid inadvertent opening of the bucket doors caused by vibration. Each of the buckets in the apparatus has its own air cylinder and over the center knuckle joint linkage to open and close the door. As shown in FIG. 2, air cylinder 52.1 is used to actuate door 52 which forms the bottom of bucket 22. Air cylinder 63.1 is used to actuate door 63 which forms the bottom of bucket 33. Air cylinder 62.1 is used to actuate door 62 which forms the bottom of bucket 32.

As shown best in FIG. 2, the bottom 62 of bucket 32 is inclined upwardly an angle of 10° from the horizontal in the direction of travel of bucket 32. The incline helps align individual licorice sticks lengthwise by urging licorice sticks towards the rear wall 32.9 of bucket 32.

Figure 5:
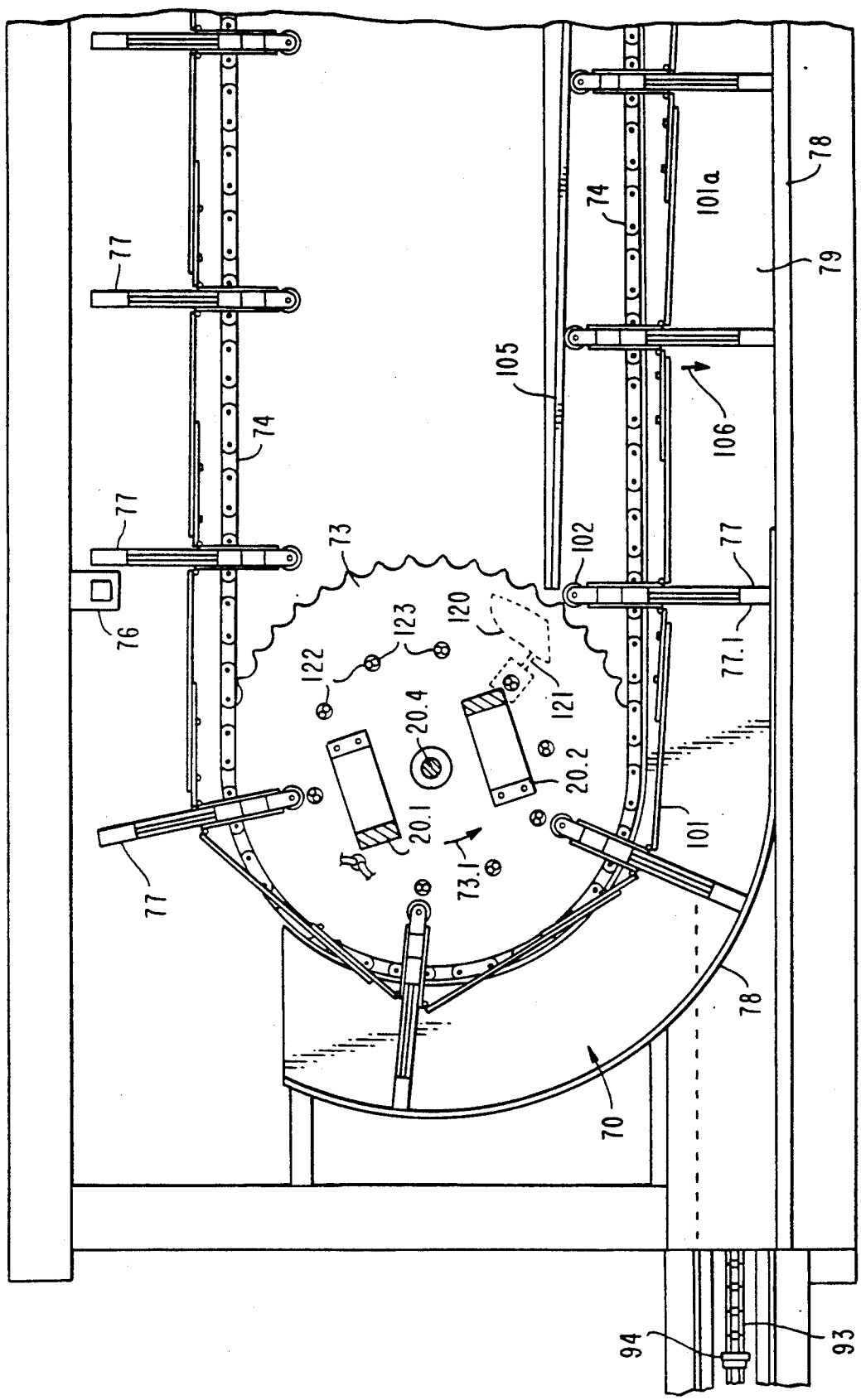
FIG. 5 is a sectional view on the line 5—5 of FIG. 4.

As shown best in FIGS. 4 and 5, turret assembly 20 is connected to and rotates with flight conveyor sprocket 73. Sprocket 73 operates on the circular path 71 depicted in FIG. 1. Turret 20 is connected to flight conveyor sprocket 73 by connecting brackets 20.1 and 20.2. By connecting turret 20 to flight conveyor sprocket 73, the buckets of the turret assembly are aligned with individual flights 77 of flight conveyor 70.

Although turret 20 is mounted to flight conveyor sprocket 30 and rotates with flight conveyor sprocket 30, turret 20 is free to move up and down relative to flight conveyor sprocket 73. As shown in FIG. 4, the weight of turret 20 is carried by shaft 20.3, which is vibrated upwardly and downwardly as shown by arrows 20.4. The vibration is caused by turret assembly vibration means shown generally as 80. Vibration means 80 includes an eccentric 81 which drives a link 82 connected to shaft 20.4. Eccentric 81 is driven by motor 83, belt 84 and drive wheel 85 shown best in FIG. 2. The stroke of the vibration is approximately 3/16 of an inch and the speed is adjustable but works well for batches of licorice sticks at approximately 300 rpm. The vibration is being constantly applied to the turret assembly 20 during operation of the machine.

Flight conveyor means 70 includes a horizontal chain 74 which is driven by a conveyor drive mechanism 75 shown best in FIG. 6. The drive mechanism 75 includes a motor 75.1, belt 75.2, pulley 75.3 and gear case 75.4 and output shaft 75.5 which continuously drives sprocket 75.6 shown schematically in FIG. 6 in the direction shown by arrow 75.7. Sprocket 75.6 drives chain 74 which in turn causes sprocket 73 to rotate in the direction shown by arrow 73.1 in FIG. 5. A flight timing sensor 76 (FIG. 5) senses the passage of the individual flights 77 and signals the automatic scale to drop a batch of licorice sticks at the correct time to land in a bucket.

Flight conveyor means 70 includes a plurality of individual flights 77 as shown in FIGS. 1 and 5. Each flight is a horizontal blade 77.1 which extends outwardly a distance to nearly touch the outer guide 78 of the flight conveyor 70.

Between each adjacent pair of flights 77, an adjustable inner guide 101 is provided. Adjustable inner guide 101 forms a wall between two adjacent flights 77. The purpose of adjustable inner guide 101 is to narrow the width of the pocket formed by two adjacent flights as the batches of licorice sticks move along the flight conveyor assembly towards the point of discharge shown in FIG. 1 by arrow 16. An inner guide rail 105 is provided which extends from sprocket 73 to the discharge point of flight conveyor assembly 70. Guide rail 105 is formed at a slight angle with chain 74 of between 3° and 5° to gently urge the adjustable guide 101 to form a narrower and narrower pocket for the batch of licorice sticks.

Figure 12:
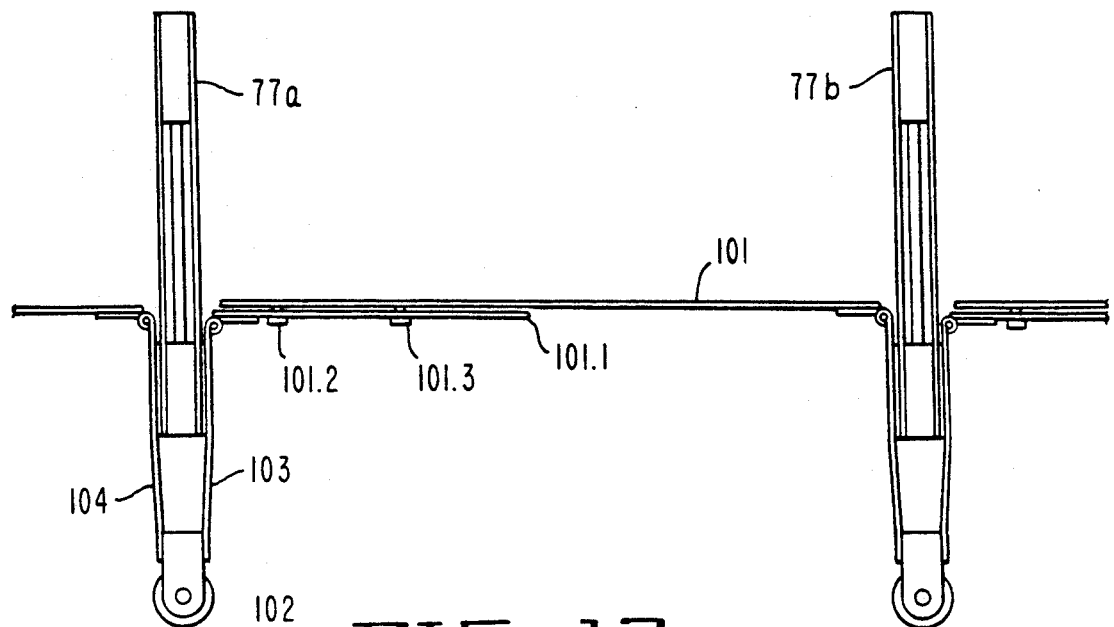
FIG. 12 is a top elevational view of a portion of the flight conveyor apparatus.

As shown best in FIG. 12, adjustable inner guide 101 extends horizontally between adjacent flights 77a and 77b. Guide 101 is connected to roller 102 through arms 103 and 104. Arms 103 and 104 are free to move relative to flight 77a. As shown in FIG. 5, as roller 102 contacts the inner guide rail 105, adjustable inner guide 101 is urged in the direction of arrow 106 so that the pocket formed between adjacent flights 77 becomes narrower as the discharge point 79.2 is approached. In the case of batches of licorice sticks, the width of the pocket is reduced from $4\frac{3}{4}''$ to $3\frac{3}{8}''$ as the flights go down the length of inner guide rail 105 and as the batches of licorice sticks are carried from the output of the turret assembly 20 to the product discharge point 79.2.

A flat pan 79 forms a part of the flight conveyor assembly 70. Pan 79 extends from just downstream of the discharge point of licorice sticks dropped from turret assembly 20, as shown by reference 79.1 (FIG. 1), and extends to the discharge point 79.2 shown in FIGS. 1 and 7. Pan 79 is continuously vibrated by pan vibration means 110 which oscillates in the direction of arrows 111 shown in FIG. 1. An arm 112 is connected to pan 79 through a pin 113. The arm 112 which induces the vibration into pan 79 is oriented at an angle of approximately 40° from the horizontal, which has the effect of inducing some up and down vibration to pan 79 but also a considerable amount of horizontal vibration in the direction of travel of the batches of licorice sticks. The horizontal acceleration induced to pan 79 tends to urge each of the sticks back towards a flight 77 and thereby tends to align the licorice sticks lengthwise as shown in FIG. 1. The pan vibration means includes an eccentric 114 (FIGS. 1 and 2) which is driven by a motor (not shown). When the apparatus is used for loading licorice sticks, eccentric 114 has a stroke of approximately 3/16" and is operated at approximately 300 rpm.

Figure 8:
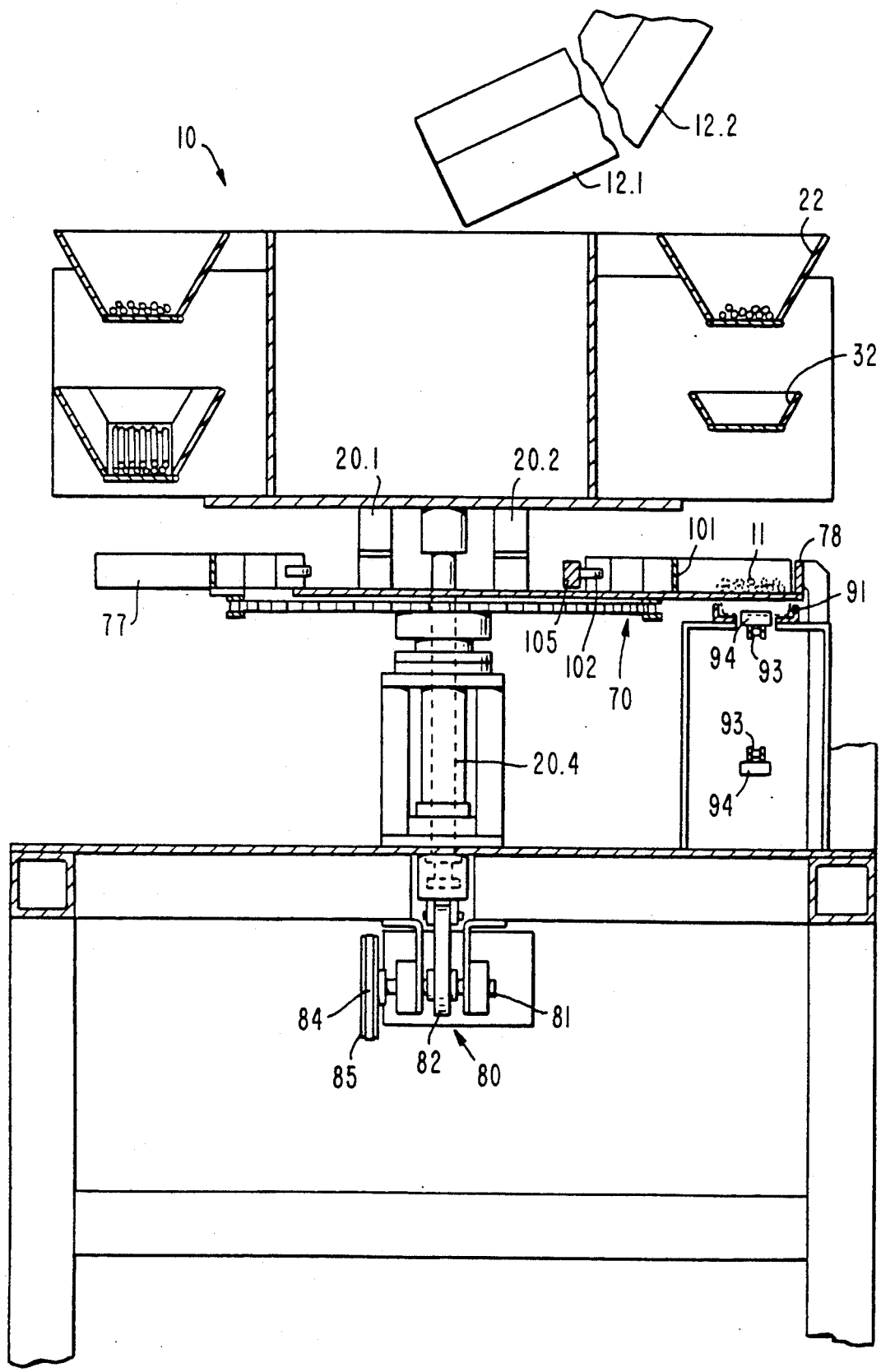
FIG. 8 is a sectional view through the apparatus.

Referring to FIG. 8, a two piece feed chute means is shown which includes a lower section 12.1 which is inclined at approximately 30° above the horizontal and a second piece 12.2 which is inclined at approximately 60° to the horizontal. Upper piece 12.2 is intended to receive the batches of licorice sticks discharged downwardly from an automatic weighing machine (not shown). The use of a two piece feed chute means wherein the two pieces are formed at an angle to each other tends to help the licorice sticks make the transition from a vertical orientation as discharged from the automatic weighing machine to a horizontal orientation after being fed into buckets 21-25.

FIG. 8 also shows guide rail 105, adjustable inner guide 101, and a batch of licorice sticks 11 moving down the flight conveyor assembly 70.

A tray conveyor 90 as shown in FIG. 1 includes a chain 93 with lugs 94 for conveying individual formed trays 91. Lugs 94 are spaced the same pitch as the flights 77 of flight conveyor means 70. Tray conveyor chain 93 is mounted under pan 79 so that the formed trays 91 are conveyed directly under the flight pockets and under pan 79 until the discharge point 79.2 of pan 79 is reached (FIG. 7). Tray conveyor means 90 extends sufficiently far past the end 79.2 of pan 79 so that the filled trays are conveyed free of the flights. Tray conveyor 90 is driven at a continuous speed by the main drive system and is timed to the speed of flights 77. A discharge means 99 is formed by the interaction of the end of pan 79 and the forward motion of flight 77 which causes batch 11 of licorice to drop into tray 91.1.

A tray former (not shown) as known in the prior art may be used in conjunction with the apparatus disclosed herein. The tray former utilizes a vacuum to pick off a tray blank from a supply stack and forms a tray. The tray former only makes trays when needed.

Figure 11:
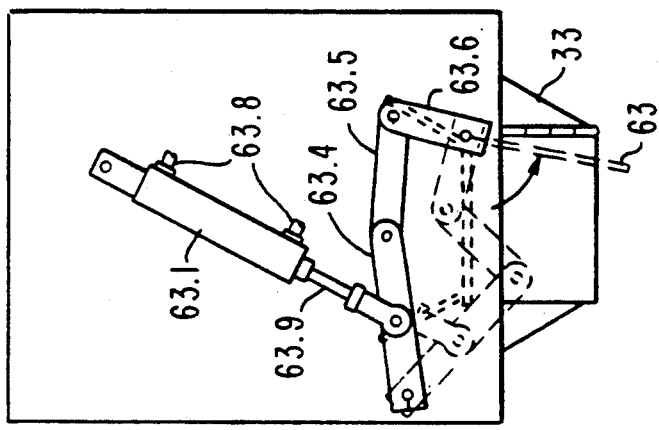
FIG. 11 is a front elevational view showing the air cylinder and linkage for controlling a lower level bucket door.
Figure 9:
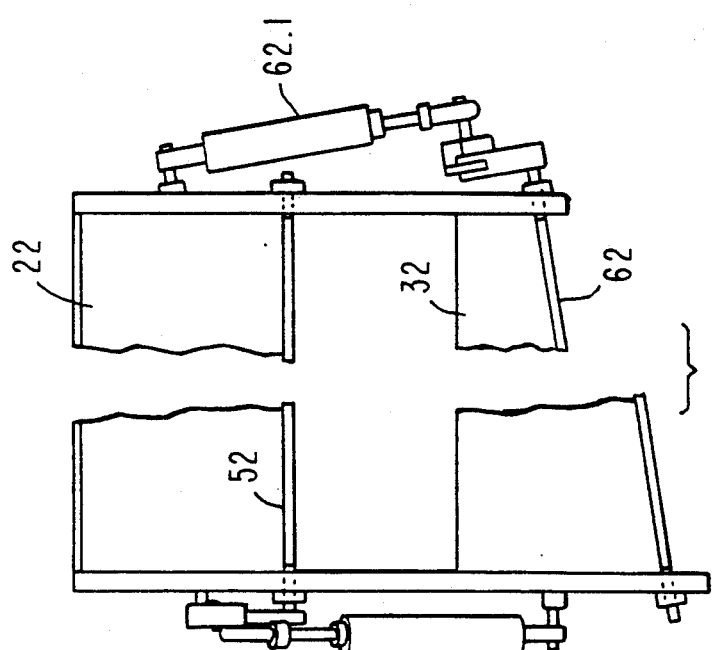
FIG. 9 is a side elevational view showing the air cylinders and linkage controlling the bucket doors.
Figure 10:
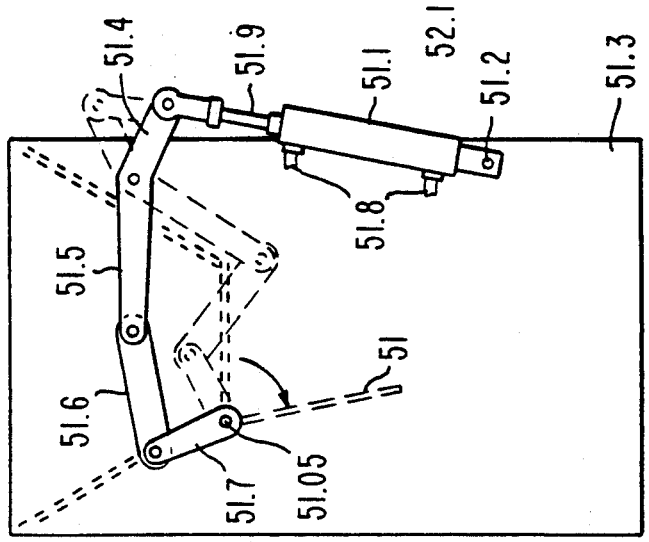
FIG. 10 is a front elevational view showing the air cylinder and linkage controlling an upper level bucket door.

FIGS. 9, 10 and 11 show in somewhat greater detail the operation of the bucket door means shown in less detail in FIG. 2. As shown in FIG. 10, air cylinder 51.1 is mounted to turret frame 51.3 by pin 51.2. A double acting piston 51.9 is actuated by air pressure through lines 51.8 and rotates linkage arms 51.4-51.7 from the positions shown in FIG. 10 to the positions shown in phantom in FIG. 10. Door 51 is rectangular and pivots about edge 51.05 and is driven to its open position when the linkage arms are driven to their position shown in phantom in FIG. 10. This linkage system is referred to as an over-the-center knuckle joint which provides a positive closure for door 51 when the linkage arms are in their position shown in FIG. 10. Since the buckets are continuously vibrated, a positive system is required for opening and closing the bucket doors, which is provided by the system shown in FIGS. 9-11. As shown in FIG. 11, cylinder 63.1 is used to open and close door 63 of bucket 33. Again, a double acting piston 63.9 is actuated by air pressure being delivered to one of ports 63.8. Piston 63.9 drives linkage arms 63.4, 63.5 and 63.6 from the position shown in FIG. 11 to the position shown in phantom in FIG. 11. When the linkage arms are moved to the position shown in phantom in FIG. 11, door 63 is open. The linkage system of FIG. 11 also utilizes an over-the-center knuckle joint which positively keeps door 63 closed unless by opened by air cylinder 63.1. FIG. 9 schematically shows the mounting of air cylinder 62.1 which controls door 62 of bucket 32 and cylinder 52.1 which controls door 52 of bucket 22.

The bucket doors are opened at the proper time by a stationary cam 120 (FIG. 5) as the air valves such as 121 come by. Air lines 122 for each air cylinder extend downwardly from turret 20 through holes 123 formed in sprocket 73.

Figure 13:
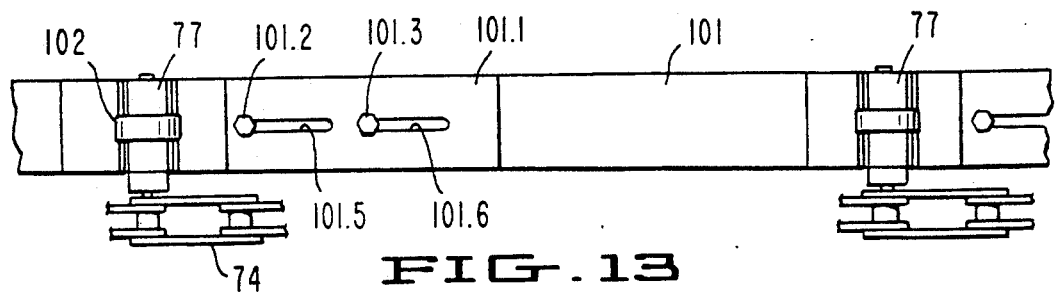
FIG. 13 is a side elevational view of a portion of the flight conveyor apparatus shown in FIG. 12.

FIG. 13 shows adjustable inner guide 101 and how adjustable guide 101 has a longitudinal adjustment to allow the guide 101 to continuously traverse the circular and inclined path shown generally in FIG. 1. Adjustable inner guide 101 has between each pair of flights 77 a second plate 101.1. Second plate 101.1 is attached to guide 101 in a manner to allow relative sliding in a horizontal direction between plates 101.1 and 101. A pair of studs 101.2 and 101.3 are carried by guide 101 and ride in longitudinal slits 101.5 and 101.6 formed in plate 101.1. In this fashion, inner guides 101 are adjustable in their horizontal length to accommodate the motion of flight conveyor 77 around the circular turns at each end of the flight conveyor's path.

Figure 14:
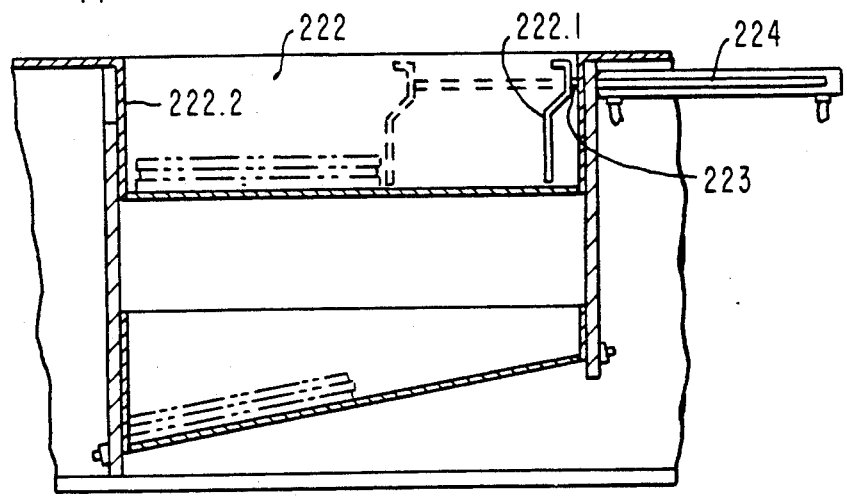
FIG. 14 is a sectional view of alternate bucket design for use in the apparatus.

FIG. 14 shows an alternate embodiment of a bucket 222 wherein a movable front wall 222.1 is provided. Front wall 222.1 is carried by the piston 223 of air cylinder 224. Front wall 222.1 may be driven towards rear wall 222.2 to the position shown in phantom in FIG. 14 by actuating air cylinder 224, thereby aligning lengthwise the batch of licorice sticks 11.

In operation, the flight conveyor means 70 and turret assembly are actuated and will run continuously empty until a signal is given to the automatic weighing machine to drop a batch of licorice sticks at the proper time in relationship to the flights of conveyor 70 and to the buckets of turret assembly 20. In operation, the scale will discharge a separate batch of licorice sticks into buckets 21-25 as turret assembly 20 rotates. The upper level of buckets continuously drop their respective batches of licorice sticks to the lower level of buckets and each bucket receives a fresh batch of licorice sticks as it passes under feed chute 12. As the batch of licorice sticks is carried around through an arc of approximately 288° in the upper level of buckets, the batch is constantly vibrated and sticks which are not parallel tend to become more parallel and tend to become aligned lengthwise. As the batches of licorice sticks are dropped from the upper buckets into the lower buckets, the sticks are again constantly being vibrated through their second rotation through approximately 288°. In the lower level of buckets, the licorice sticks are also urged downwardly toward the rear wall by the incline of the floor of the lower buckets and tend to become somewhat more aligned lengthwise.

As each batch of licorice sticks is discharged from a lower bucket onto the flight conveyor, it is moved forward by one of the flights and on to the vibrating pan assembly. As the batch of licorice sticks is pushed down the flight conveyor assembly by one of the flights, the batch is further vibrated. The vibration includes an element of vertical vibration and an element of horizontal vibration which tends to further align the licorice sticks lengthwise. As the batch of licorice sticks moves down the flight conveyor, the batch is squeezed together into a tighter bundle by the inward motion of the adjustable inner guide so that, when the batch of licorice sticks reaches the discharge point, it fits easily into a single tray.

The loader apparatus is therefore capable of operating automatically and continuously to receive weighted batches of product from an automatic weighing machine and to continuously load such batches into an individual container.

What is claimed is:

1. In an automatic loading apparatus for aligning and loading a predetermined amount of elongated strips of product into individual containers wherein batches of elongated strips are periodically discharged from a product feed, the improvement comprising:
    turret assembly means having a plurality of buckets, wherein said buckets move through a horizontal path, and wherein each of said batches from said product feed is received by a separate one of said buckets,
    turret vibration means for vibrating said turret assembly means to cause said batches of elongated strips to become somewhat more aligned, and
    bucket door means formed in each of said buckets for periodically emptying said batches from said buckets.

2. The apparatus of claim 1 wherein said turret assembly means has at least two levels of buckets, one above the other, wherein each level of buckets follows a circular path, and wherein said upper level of buckets periodically empties its batch of elongated strips into a bucket moving on said lower level.

3. The apparatus of claim 2 wherein each of said buckets on said lower level has a bottom which is inclined upwardly in the direction of travel of said bucket.

4. An automatic loading apparatus for aligning and loading a predetermined amount of elongated strips of product into individual containers wherein batches of elongated strips are periodically discharged from a product feed, comprising:
    turret assembly means adapted to rotate about a vertical axis, having a plurality of buckets arranged in a path around said vertical axis, wherein each of said batches from the product feed is fed into a separate one of said buckets,
    turret vibration means for vibrating said turret assembly means to cause said batches of elongated strips to become somewhat more aligned,
    bucket door means formed in each of said buckets for periodically emptying said batches from said buckets,
    flight conveyor means, having a horizontal pan and a plurality of flights, wherein each of said buckets empties its batch onto said pan between adjacent flights,
    pan vibrating means for vibrating said pan to cause further alignment of said elongated strips, and
    discharge means for transferring each of said batches from said flight conveyor means into a separate container.

5. The apparatus of claim 4 wherein said turret assembly means has an upper and lower level of buckets, and wherein said buckets on the upper level periodically empty their contents into a bucket on said lower level, and wherein said buckets on said lower level periodically empty their contents onto said flight conveyor means.

6. The apparatus of claim 4 further comprising an adjustable inner guide means for said flight conveyor means for gradually narrowing the pocket formed between adjacent flights of said flight conveyor means.

7. The apparatus of claim 4 wherein said bucket door means includes a door actuating means wherein an over the center knuckle joint linkage is driven by an air cylinder.

* * * * *